(12) United States Patent
Yoshida (10) Patent No.: US 11,717,898 B2
(45) Date of Patent: Aug. 8, 2023

(54) CUTTING INSERT

(71) Applicant: TUNGALOY CORPORATION, Fukushima (JP)

(72) Inventor: Satoru Yoshida, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 108 days.

(21) Appl. No.: 16/985,034

(22) Filed: Aug. 4, 2020

(65) Prior Publication Data

US 2021/0060668 A1 Mar. 4, 2021

(30) Foreign Application Priority Data

Aug. 28, 2019 (JP) ................................. 2019-155664

(51) Int. Cl.
*B23C 5/20* (2006.01)
*B23C 5/02* (2006.01)

(52) U.S. Cl.
CPC .......... *B23C 5/202* (2013.01); *B23C 2200/08* (2013.01); *B23C 2200/208* (2013.01)

(58) Field of Classification Search
CPC .... B23C 2200/0433; B23C 2200/0494; B23C 2200/286; B23C 2200/367; B23C 5/109; B23C 5/202; B23C 5/207
See application file for complete search history.

(56) References Cited

U.S. PATENT DOCUMENTS

| | | | | |
|---|---|---|---|---|
| 3,762,005 A * | 10/1973 | Erkfritz | ................. | B23C 5/2213 407/113 |
| 4,124,326 A * | 11/1978 | Cost | ...................... | B23B 27/141 407/114 |
| 9,205,499 B2 * | 12/2015 | Morrison | ................ | B23C 5/207 |
| 9,475,138 B2 * | 10/2016 | Morrison | .............. | B23C 5/2472 |
| 2004/0022590 A1 * | 2/2004 | Satran | ................... | B23C 5/2213 407/113 |
| 2009/0136304 A1 | 5/2009 | Satran et al. | | |
| 2010/0129166 A1 * | 5/2010 | Hartlohner | ............ | B23C 5/2217 407/102 |
| 2013/0108387 A1 | 5/2013 | Ishi et al. | | |

(Continued)

FOREIGN PATENT DOCUMENTS

| | | |
|---|---|---|
| EP | 1782902 A3 | 12/2010 |
| EP | 2774706 A1 | 9/2014 |

(Continued)

*Primary Examiner* — Nicole N Ramos
(74) *Attorney, Agent, or Firm* — Studebaker & Brackett PC (57) ABSTRACT

A cutting insert 2 comprises a peripheral side surface 30 which is parallel to a central axis O of a first end surface 10 and a second end surface 20. The peripheral side surface 30 comprises a first side surface 31 facing a first major cutting edge 11, a second side surface 32 facing a first wiper edge 12, and a third side surface 33 facing a first inner edge 13. A flank 311 of the first major cutting edge 11 and a flank 321 of the first wiper edge 12 are inclined such that the flank 311 and 321 approaches the central axis O as it heads toward the first end surface 10. The flank 311 of the first major cutting edge 11 is located on a different plane from the first side surface 31. The flank 321 of the first wiper edge 12 is located on a different plane from the second side surface 32. Meanwhile, a flank of the first inner edge 13 is located on the same plane as the third side surface 33.

16 Claims, 10 Drawing Sheets

(56) References Cited

U.S. PATENT DOCUMENTS

| | | | |
|---|---|---|---|
| 2013/0266392 A1* | 10/2013 | Lee | B23C 5/006 409/234 |
| 2018/0036811 A1 | 2/2018 | Saji et al. | |
| 2019/0240746 A1 | 8/2019 | Kitajima et al. | |

FOREIGN PATENT DOCUMENTS

| | | |
|---|---|---|
| EP | 3351328 A1 | 7/2018 |
| JP | 2007-125669 A | 5/2007 |
| JP | 2011-104738 A | 6/2011 |
| JP | 2018-043321 A | 3/2018 |
| JP | 6424975 B1 | 11/2018 |
| WO | 2012/014977 A1 | 2/2012 |
| WO | 2012/165094 A1 | 12/2012 |
| WO | 2015/080168 A1 | 6/2015 |
| WO | 2016/140333 A1 | 9/2016 |

* cited by examiner

CUTTING INSERT

CROSS-REFERENCES TO RELATED APPLICATIONS

This application relates to and claims priority from Japanese Patent Application No. 2019-155664, filed on (Aug. 28, 2019), the entire disclosure of which is incorporated herein by reference.

BACKGROUND

Field

The present invention relates to a cutting insert.

Description of Related Art

A cutting insert mounted on an indexable rotating tool comprises a major cutting edge which performs cutting in a radial direction of a tool body. A cutting insert which performs cutting in a radial direction of a tool body and wipes off a bottom surface further comprises a wiper edge which is formed substantially parallel to the bottom surface. A cutting insert which allows for ramping, which involves cutting in an oblique direction deriving from a combination of an axial direction of a tool body and a perpendicular direction to such axial direction, further comprises an inner edge which is positioned inside with respect to a radial direction of a tool body in order to cut a part of a workpiece which cannot be chipped by a preceding cutting edge with respect to a feed direction, with the use of the subsequent cutting edge and, in turn, to cut the workpiece having a stepwise shape which is left through cutting with a major cutting edge.

As to ramping, particularly in a negative insert having cutting edges on the front and back sides thereof, when a flank of a wiper edge and a flank of an inner edge are located on the same plane, the flank of the wiper edge will interfere with a workpiece. Thus, it has been necessary to make a choice between: (i) placing a high priority on improved working efficiency of ramping while sacrificing bottom-surface accuracy; and (ii) placing a high priority on bottom-surface accuracy while trading off ramping.

A cutting insert which allows for both radial-direction machining and oblique-direction machining in order to simultaneously secure high bottom-surface accuracy and perform highly efficient machining has been proposed (see, for example, JP6424975 B). The cutting insert disclosed in JP6424975 B comprises both wiper edges and inner edges, wherein each wiper edge is formed in a reverse positive shape with a negative clearance angle while each inner edge is formed in a positive shape with a positive clearance angle. A side surface, in its entirety, as seen from a leading end side of a tool body of the cutting insert is used as a flank, and this flank is divided into quarters corresponding to the wiper edges and inner edges on the front and back sides.

SUMMARY

However, the cutting insert disclosed in JP6424975 B involves the occurrence of an undercut in the side surface as seen from the leading end side of the tool body and therefore has an inappropriate shape for manufacturing with a die. Thus, a flank is formed by grinding rather than by using a die; however, the substantially equal quarters obtained through the division of the side surface have different angles, which requires a number of passes for grinding finishing, thereby leading to a number of changeovers to adjust the angle between a grinding stone and the cutting insert. Accordingly, it has been difficult to manufacture a cutting insert which allows for ramping.

An object of the present invention is to provide a cutting insert which is compatible with various types of machining and has excellent manufacturability.

A cutting insert according to an aspect of the present invention comprises a first end surface, a second end surface on an opposite side to the first end surface, and a peripheral side surface which is parallel to a central axis connecting a center of the first end surface and a center of the second end surface and which connects the first end surface and the second end surface. A first major cutting edge, a first wiper edge adjacent to the first major cutting edge, and a first inner edge adjacent to the first wiper edge are formed in a periphery of the first end surface. The peripheral side surface comprises a first side surface facing the first major cutting edge, a second side surface facing the first wiper edge, and a third side surface facing the first inner edge. A flank of the first major cutting edge and a flank of the first wiper edge are inclined so as to approach the center of the first end surface, heading toward the first end surface. The flank of the first major cutting edge is located on a different plane from the first side surface. The flank of the first wiper edge is located on a different plane from the second side surface. Meanwhile, a flank of the first inner edge is located on the same plane as the third side surface.

According to this aspect, the flank of the first inner edge and the flank of the first wiper edge are formed on different planes. The flank of the first wiper edge is retracted to a position which does not interfere with a surface which has been ground by the first inner edge, and it is therefore possible to perform ramping in an oblique direction deriving from a combination of a radial direction of a tool body and an axial direction thereof. Part of the peripheral side surface which excludes the flank of the first wiper edge is perpendicular to the second end surface, and this therefore makes it easier to perform machining in the manufacturing process. To be more specific, the peripheral side surface is, throughout the periphery thereof, perpendicular to the first end surface and the second end surface, and it is therefore possible to manufacture the cutting insert using a mold alone. The peripheral side surface may be ground. When such grinding is performed, since the peripheral side surface is perpendicular to the second end surface, the number of changeovers in the grinding process can be reduced, so that the peripheral side surface can be ground with a minimum number of passes. Accordingly, it is possible to provide a cutting insert which is compatible with various types of machining without needing to be replaced and which has excellent manufacturability.

In the above aspect, the first major cutting edge may be bent in a protruding V shape toward the second end surface.

According to this aspect, a lower half of the first major cutting edge has a positive axial rake angle, which indicates low cutting resistance. The lower half of the first major cutting edge can suppress heat generation derived from cutting resistance. Meanwhile, an upper half of the first major cutting edge has a negative axial rake angle, which indicates high cutting resistance. A larger depth of cut in the axial direction leads to the production of larger chips during machining, and if the axial rake angle were to be positive throughout the cutting edge, the chips would extend upward. When the axial rake angle of the upper half is made to be negative, extension of chips is suppressed, thereby enabling the production of compact chips. Further, in machining with a large depth of cut in an axial direction and high cutting resistance, burrs are produced during machining; however, since the axial rake angle of the upper half is negative, production of burrs can be suppressed.

In the above aspect, the first end surface may be of 180-degree symmetry around the central axis. A second major cutting edge opposing the first major cutting edge, a second wiper edge adjacent to the second major cutting edge, and a second inner edge adjacent to the second wiper edge are further formed in the periphery of the first end surface. The first end surface may be divided into two halves by a protruding ridge which is disposed between the first major cutting edge and the second major cutting edge. The protruding ridge may be formed as a curved surface whose amount of protrusion from the first end surface decreases as it approaches the central axis.

When the protruding ridge from the first end surface is provided, chips heading toward the first end surface can be separated into small pieces so that the first end surface can be protected. Further, in the first major cutting edge, which is bent in a V shape, a center part thereof, being a boundary of the lower half and the upper half of the first major cutting edge, is most likely to come into contact with the first end surface. The protruding ridge is connected to the center part of the first major cutting edge so as to divide a rake surface into two halves. The protruding ridge is arranged at a location where collision of chips occurs easily, and the first end surface can therefore be efficiently protected. The protruding ridge is formed as a curved surface whose amount of protrusion decreases as it approaches the central axis. A peripheral part of the protruding ridge, which chips easily collide with, has a large amount of protrusion, and is therefore less likely to wear. A center part of the protruding ridge, which chips are less likely to collide with, has a small amount of protrusion and a narrow width, and thus, when reversing the first end surface and the second end surface so that the first end surface serves as a restraining surface, it is possible to increase a contact area of the first end surface with an insert pocket.

In the above aspect, the cutting insert may be configured as a vertical-placement insert in which a mounting hole for fixing the cutting insert to a tool body is formed in the first side surface. The first major cutting edge may be inclined so as to head toward the second end surface, heading away from the first wiper edge.

According to this aspect, the first major cutting edge is configured so as to be retracted in a feed direction of a rotating tool, heading away from the first wiper edge. Such shape allows chips to be discharged with efficiency. Further, such shape achieves reduced cutting resistance, thereby enabling suppression of the occurrence of chipping in edges due to an excessive load.

In the above aspect, the first major cutting edge may bulge in a direction away from the central axis.

According to this aspect, the rotational trajectory of the first major cutting edge approximates an ideal, virtual cylindrical surface, thereby enabling a finished surface with excellent smoothness to be formed.

According to the present invention, it is possible to provide a cutting insert which is compatible with various types of machining and has excellent manufacturability.

DETAILED DESCRIPTION

Preferred embodiments of the present invention will now be described below with reference to the accompanying drawings. In each of the drawings, components denoted by the same reference numeral have the same or similar configurations. A rotating tool 1 comprising a cutting insert 2 of an embodiment of the present invention is compatible with both machining in a radial direction Dr of a tool body 3 and machining in an oblique direction deriving from a combination of the radial direction Dr of the tool body 3 and an axial direction Dz thereof.

In order to perform machining in the oblique direction, a flank 321 (352, 364, etc.) of a wiper edge 12 (15, 22, 25) and a flank 33 (36, 32, 35) of an inner edge 13 (16, 23, 26) are configured so as not to be located on the same plane. One of the characteristics of the cutting insert 2 of the present invention is that the inner edge 13 (16, 23, 26) is not configured to have a positive shape whose clearance angle γ is positive, but is instead configured to have a negative shape whose clearance angle is zero.

If the inner edge 13 (16, 23, 26) were to have a positive shape, this would lead to an undercut shape in which the inner edge 13 overhangs with respect to an intermediate part between a first end surface 10 and a second end surface 20, it would therefore be difficult to form the flank with the use of a mold alone. Even if the flank were to be formed by grinding, such flank would have a complicated shape, which requires a number of passes for grinding finishing, thereby leading to great expense in the effort needed for changeovers.

Meanwhile, since, in the cutting insert 2 of the present invention, the inner edge 13 (16, 23, 26) has a negative shape, it is possible to allow the flank of the inner edge 13 to exist on the same plane as a peripheral side surface 30. The cutting insert 2 has no undercut, and it is therefore easy to manufacture such cutting insert 2 with a mold. When grinding finishing is performed, only a small number of passes is required. Such cutting insert 2 is compatible with various types of machining and also has excellent manufacturability. The respective configurations will hereinafter be described in detail with reference to FIGS. 1 to 10.

Figure 1:
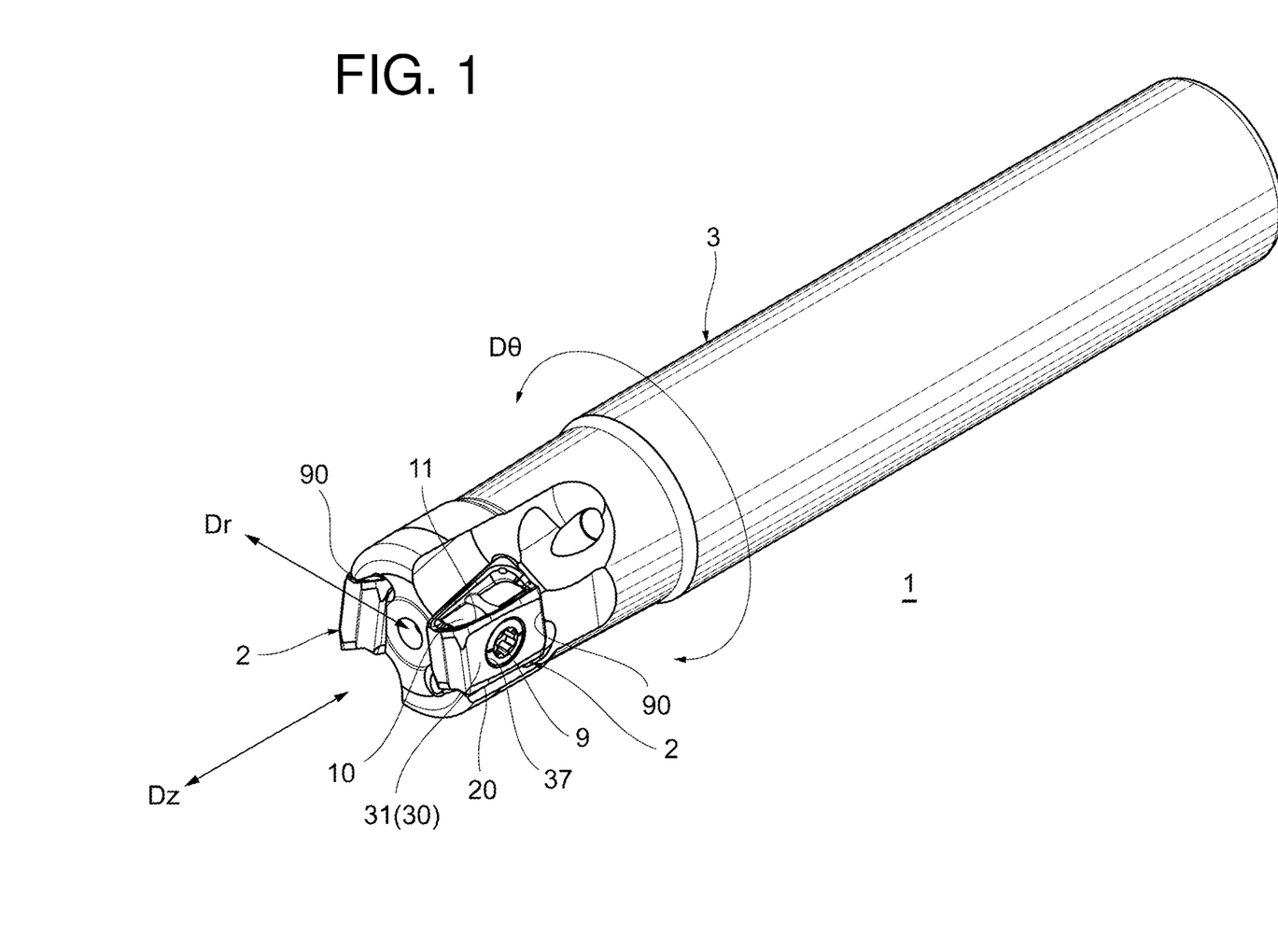
FIG. 1 is a perspective view illustrating an example of a rotating tool according to an embodiment of the present invention.

FIG. 1 is a perspective view illustrating an example of a rotating tool 1 comprising cutting inserts 2 according to an embodiment of the present invention. As shown in FIG. 1, the rotating tool 1, which is of an indexable type, can be configured by combining a tool body 3 to be rotationally driven and the cutting inserts 2, which are each replaceable. Insert pockets 90 are provided at a leading end of the tool body 3. Each cutting insert 2 is fixed to each insert pocket 90.

In the illustrated example, the insert pockets 90 are provided at two locations. No particular limitation is placed on the number of insert pockets 90, and such number may be one or may be three or more. In the illustrated example, clamping means which fixes the cutting inert 2 to the insert pocket 90 is configured to be of a screw-on type in which a fastening screw 9 is inserted through a mounting hole 37 of the cutting insert 2. It should be noted that the tool body 3 is not limited to being the screw-on type and may instead be a lever-lock type, etc.

In the illustrated example, the cutting insert 2 is configured as a vertical-placement insert in which the mounting hole 37 is formed so as to penetrate not a rake surface (the first end surface 10) but a flank (a first side surface 31) of a first major cutting edge 11. However, the cutting insert 2 is not limited to being a vertical-placement insert and may instead be a horizontal-placement insert in which a mounting hole is formed so as to penetrate a rake surface.

Figure 2:
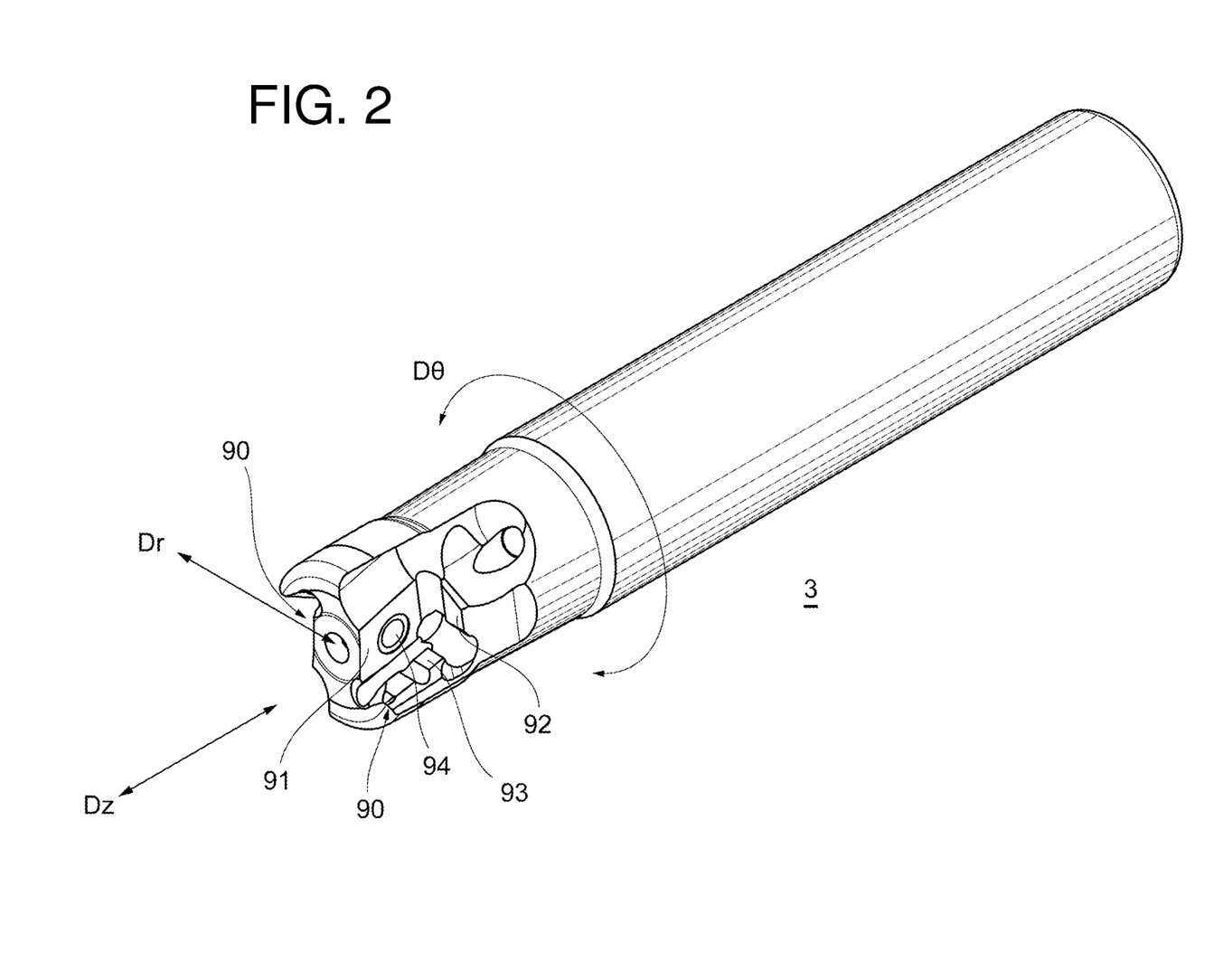
FIG. 2 is a perspective view illustrating an example of a tool body shown in FIG. 1.

FIG. 2 is a perspective view illustrating the tool body 3 shown in FIG. 1. As shown in FIG. 2, the insert pocket 90 comprises: a seating surface 91 which supports the cutting insert 2 from the radial direction Dr of the tool body 3; a seating surface 92 which supports the cutting insert 2 from the axial direction Dz of the tool body 3; and a seating surface 93 which supports the cutting insert 2 from a circumferential direction Dθ of the tool body 3.

Figure 3:
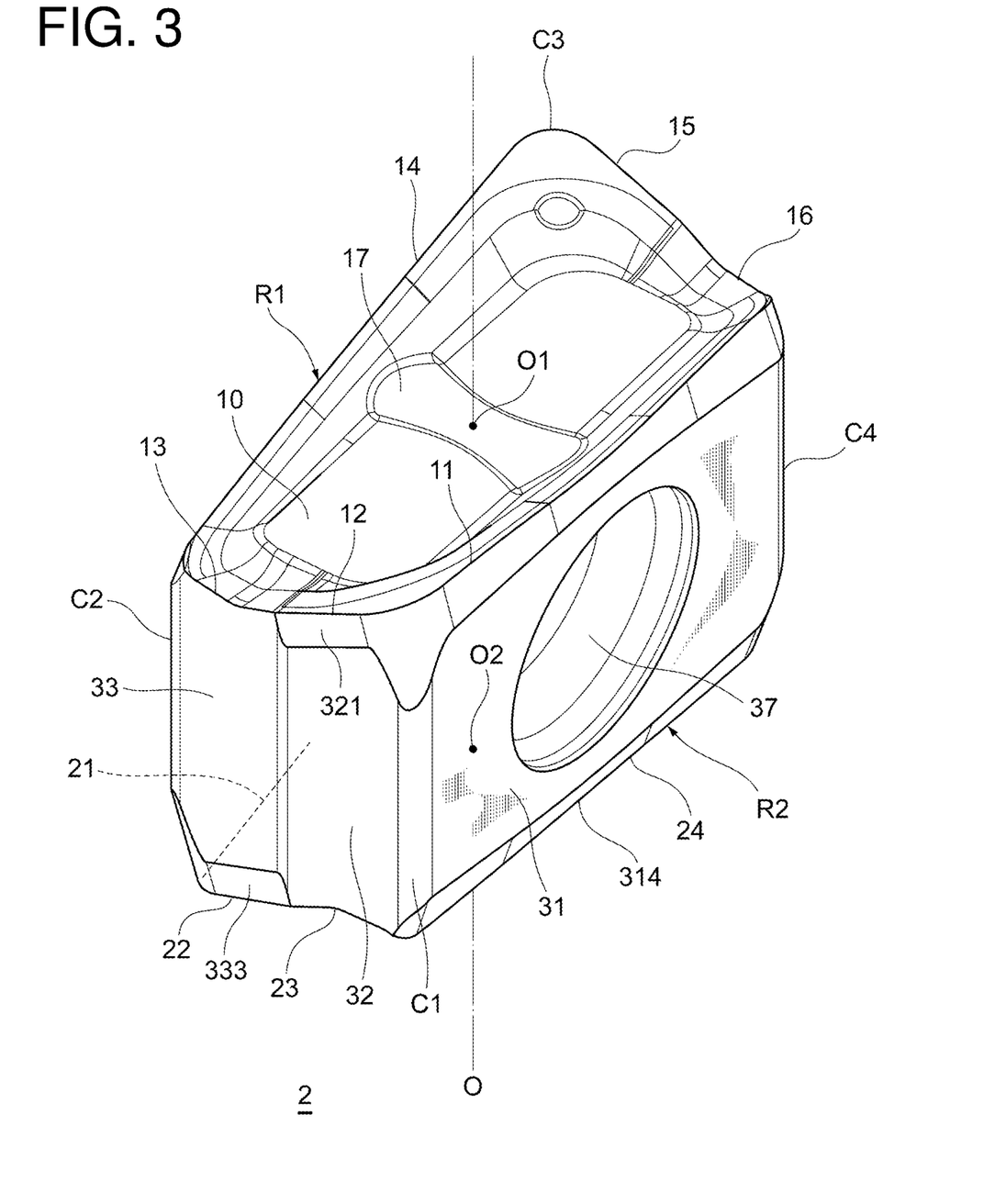
FIG. 3 is a perspective view illustrating an example of a cutting insert of an embodiment of the present invention.

FIG. 3 is a perspective view illustrating an example of a cutting insert 2 according to an embodiment of the present invention. No particular limitation is placed on the material for the cutting insert 2, and various cutting insert materials, including a cemented carbide, are applicable here. As shown in FIG. 3, the cutting insert 2 comprises a first end surface 10, a second end surface 20 on an opposite side to the first end surface 10, and a peripheral side surface 30 connecting the first and second end surfaces 10, 20.

In the illustrated example, the first and second end surfaces 10, 20 have substantially the same shape and function. In the rotating tool 1, the first end surface 10 may serve as a rake surface while the second end surface may serve as a restraining surface; alternatively, the second end surface 20 may serve as a rake surface while the first end surface 10 may serve as a restraining surface. Thus, the first end surface 10 will be described in more detail below as a representative example, and repeated description of the second end surface 20 may hereinafter be omitted. However, the first and second end surfaces 10, 20 may not necessarily have the same shape. For example, the first end surface 10 may be configured so as to be dedicated to a rake surface while the second end surface 20 may be configured so as to be dedicated to a restraining surface.

In the illustrated example, the first end surface 10 is formed so as to be of 180-degree symmetry around a center O1. Similarly, the second end surface 20 is formed so as to be of 180-degree symmetry around a center O2. In the description below, a line connecting the center O1 of the first end surface 10 and the center O2 of the second end surface 20 is referred to as a central axis O of the rake surface. It should be noted that, when neither the first nor the second end surface 10, 20 has a shape of point symmetry, each of their centers O1, O2 is, for example, a center of gravity.

In the illustrated example, the cutting insert 2 has four corners C1, C2, C3, C4, and the peripheral side surface 30 is formed in a square pole shape extending along the central axis O. Peripheries R1, R2 of the first and second end surfaces 10, 20 are each formed in a rectangular shape.

A first major cutting edge 11 is formed in one of the long sides of the periphery R1 of the first end surface 10, and a second major cutting edge 14 is formed in the other long side thereof. A first wiper edge 12, which is adjacent to the first major cutting edge 11 across the corner C1, and a first inner edge 13 adjacent to the first wiper edge 12, are formed in one of the short sides of the periphery R1. Similarly, a second wiper edge 15, which is adjacent to the second major cutting edge 14 across the corner C3, and a second inner edge 16 adjacent to the second wiper edge 15, are formed in the other short side of the periphery R1.

Similarly, the periphery R2 of the second end surface 20 comprises: a third major cutting edge 21, which is formed in one of the long sides of the periphery R2; a fourth major cutting edge 24, which is formed in the other long side thereof; a third wiper edge 22 and a third inner edge 23, which are formed in one of the short sides thereof; and a fourth wiper edge 25 (shown in FIG. 4) and a fourth inner edge (not shown), which are formed in the other short side thereof.

The peripheral side surface 30 is formed parallel to the central axis O. The peripheral side surface 30 comprises first through sixth side surfaces 31, 32, 33, 34, 35, 36. The first through sixth side surfaces 31, 32, 33, 34, 35, 36 are located on different planes from one another. The first side surface 31 is formed so as to face the first and fourth major cutting edges 11, 24 and constitutes a plane parallel to the central axis O. Similarly, the fourth side surface 34 is formed so as to face the second and third major cutting edges 14, 21 and constitutes a plane parallel to the central axis O.

The second side surface 32 is formed so as to face the first wiper edge 12 and configures a flank of the third inner edge 23. Similarly, the third side surface 33 configures a flank of the first inner edge 13 and is formed so as to face the third wiper edge 22. Similarly, the fifth side surface 35 is formed so as to face the second wiper edge 15 and configures a flank of the fourth inner edge. Similarly, the sixth side surface 36 configures a flank of the second inner edge 16 and is formed so as to face the fourth wiper edge 25.

The cutting insert 2 further comprises flanks of the first through fourth major cutting edges 11, 14, 21, 24 and flanks of the first through fourth wiper edges 12, 15, 22, 25. The flanks of the first and second major cutting edges 11, 14 and the flanks of the first and second wiper edges 12, 15 are inclined so as to approach the central axis O heading toward the first end surface 10. Similarly, the flanks of the third and fourth major cutting edges 21, 24 and the flanks of the third and fourth wiper edges 22, 25 are inclined so as to approach the central axis O heading toward the second end surface 20.

The flank of the first major cutting edge 11, i.e., a flank 311, is not located on the same plane as the first side surface 31. The flank 311 of the first major cutting edge 11 is located on a plane intersecting the first side surface 31 and connects the first major cutting edge 11 and the first side surface 31. Similarly, the flank of the second major cutting edge 14, i.e., a flank 342, is located on a plane intersecting the fourth side surface 34 and connects the second major cutting edge 14 and the fourth side surface 34. Similarly, the flank (not shown) of the third major cutting edge 21 is located on a plane intersecting the fourth side surface 34 and connects the third major cutting edge 21 and the fourth side surface 34. Similarly, the flank of the fourth major cutting edge 24, i.e., a flank 314, is located on a plane intersecting the first side surface 31 and connects the fourth major cutting edge 24 and the first side surface 31.

The flank of the first wiper edge 12, i.e., a flank 321, is not located on the same plane as the second side surface 32. The flank 321 of the first wiper edge 12 is located on a plane intersecting the second side surface 32 and connects the first wiper edge 12 and the second side surface 32. Similarly, the flank of the second wiper edge 15, i.e., a flank 352, is located on a plane intersecting the fifth side surface 35 and connects the second wiper edge 15 and the fifth side surface 35. Similarly, the flank of the third wiper edge 22, i.e., a flank 333, is located on a plane intersecting the third side surface 33 and connects the third wiper edge 22 and the third side surface 33. Similarly, the flank of the fourth wiper edge 25, i.e., a flank 364 (shown in FIG. 4), is located on a plane intersecting the sixth side surface 36 and connects the fourth wiper edge 25 and the sixth side surface 36.

Figure 4:
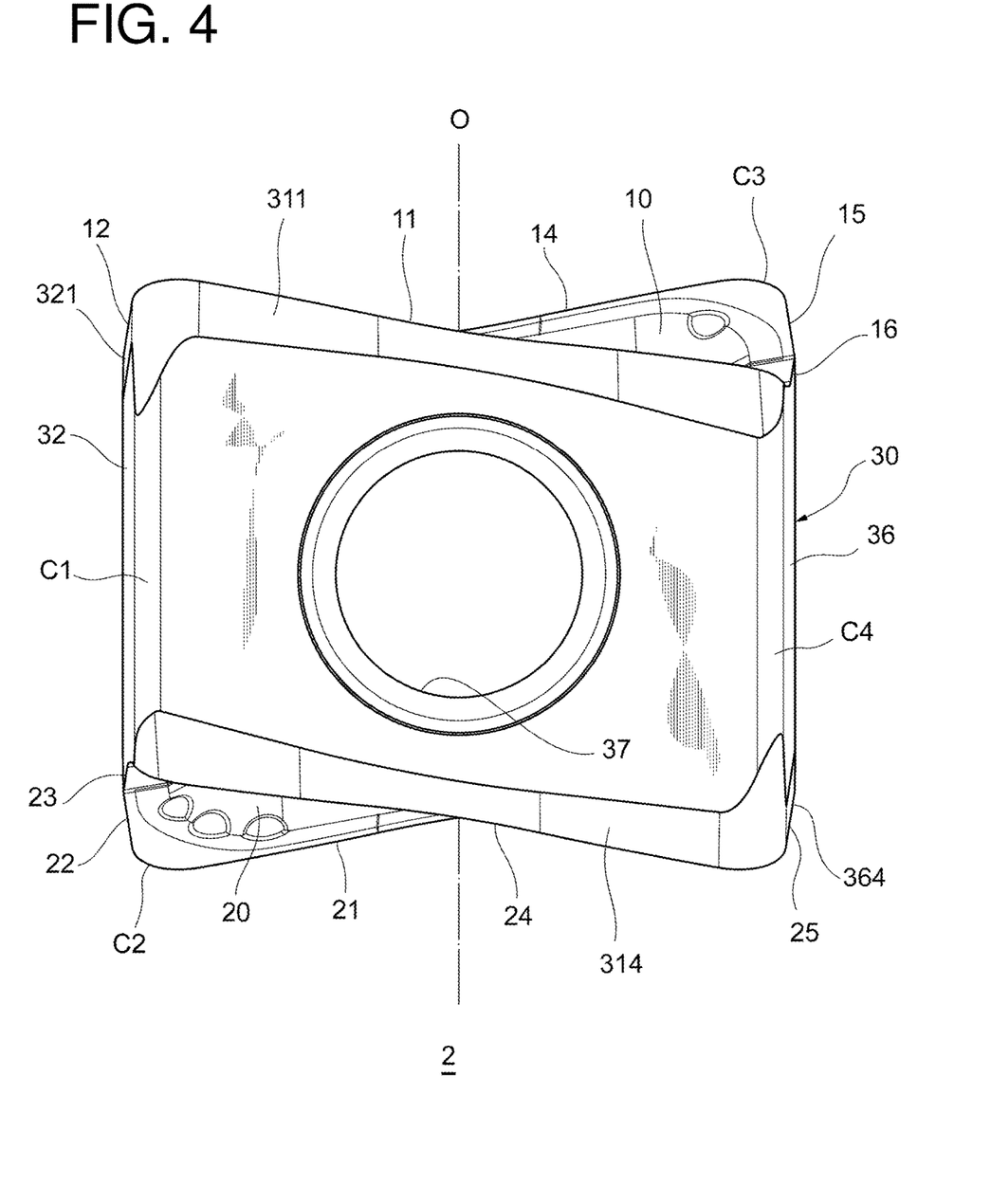
FIG. 4 is a side view illustrating a first side surface of the cutting insert shown in FIG. 3.

FIG. 4 is a side view illustrating the first side surface 31 of the cutting insert shown in FIG. 3. As shown in FIG. 4, the first major cutting edge 11 is inclined so as to head toward the second end surface 20, heading away from the first wiper edge 12. Similarly, the second major cutting edge 14 is inclined so as to head toward the second end surface 20, heading away from the second wiper edge 15. Similarly, the third major cutting edge 21 is inclined so as to head toward the first end surface 10, heading away from the third wiper edge 22. Similarly, the fourth major cutting edge 24 is inclined so as to head toward the first end surface 10, heading away from the fourth wiper edge 25.

Figure 5:
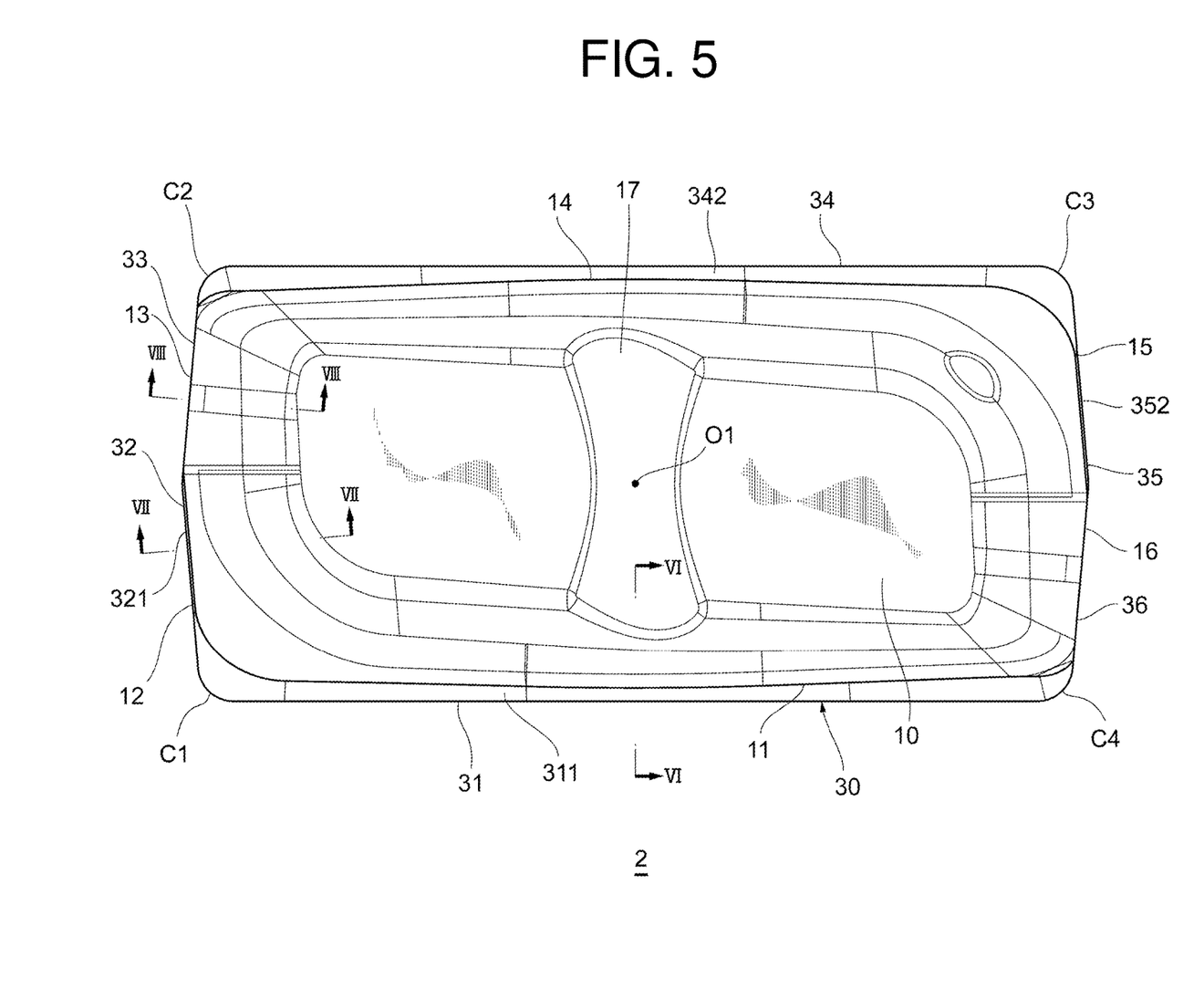
FIG. 5 is a plan view illustrating a first end surface of the cutting insert shown in FIG. 3.

FIG. 5 is a plan view illustrating the first end surface 10 of the cutting insert 2 shown in FIG. 3. As shown in FIG. 5, the cutting insert 2 further comprises a protruding ridge 17, which is provided in the first end surface 10. The first end surface 10 is divided into two halves by the protruding ridge 17, which is disposed between a center part of the first major cutting edge 11 and a center part of the second major cutting edge 14. The protruding ridge 17 is formed as a curved surface (e.g., a torus surface) whose amount of protrusion from the first end surface 10 decreases as the protruding ridge 17 approaches the central axis O. Similarly, although not shown in the figure, the second end surface 20 is divided into two halves by a protruding ridge which is disposed between a center part of the third major cutting edge 21 and a center part of the fourth major cutting edge 24.

Figure 6:
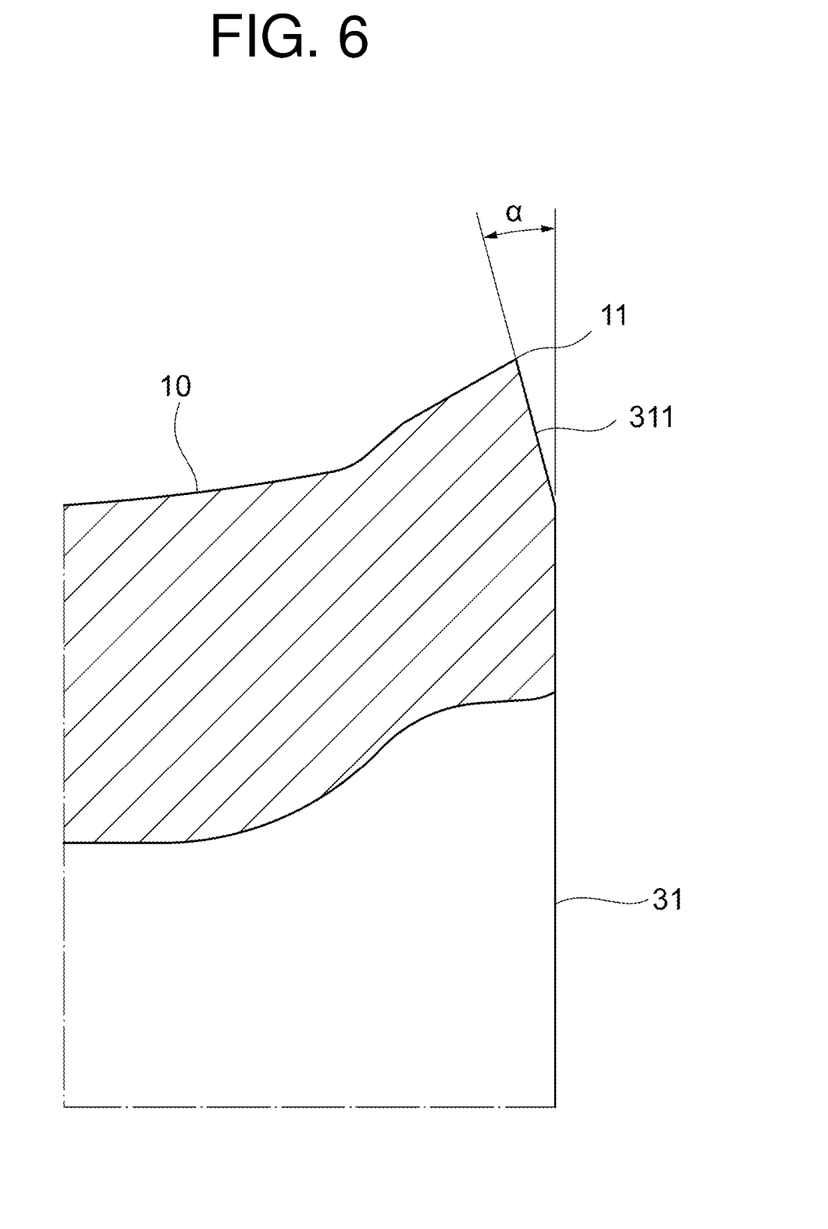
FIG. 6 is a cross-sectional view taken along a line VI-VI shown in FIG. 5.

FIG. 6 is a cross-sectional view taken along a line VI-VI shown in FIG. 5. As shown in FIG. 6, the first major cutting edge 11 is formed in a reverse positive shape, whose clearance angle α is negative. Similarly, the second through fourth major cutting edges 14, 21, 24 are each formed in a reverse positive shape. In the illustrated example, the clearance angle α is −15°.

Figure 7:
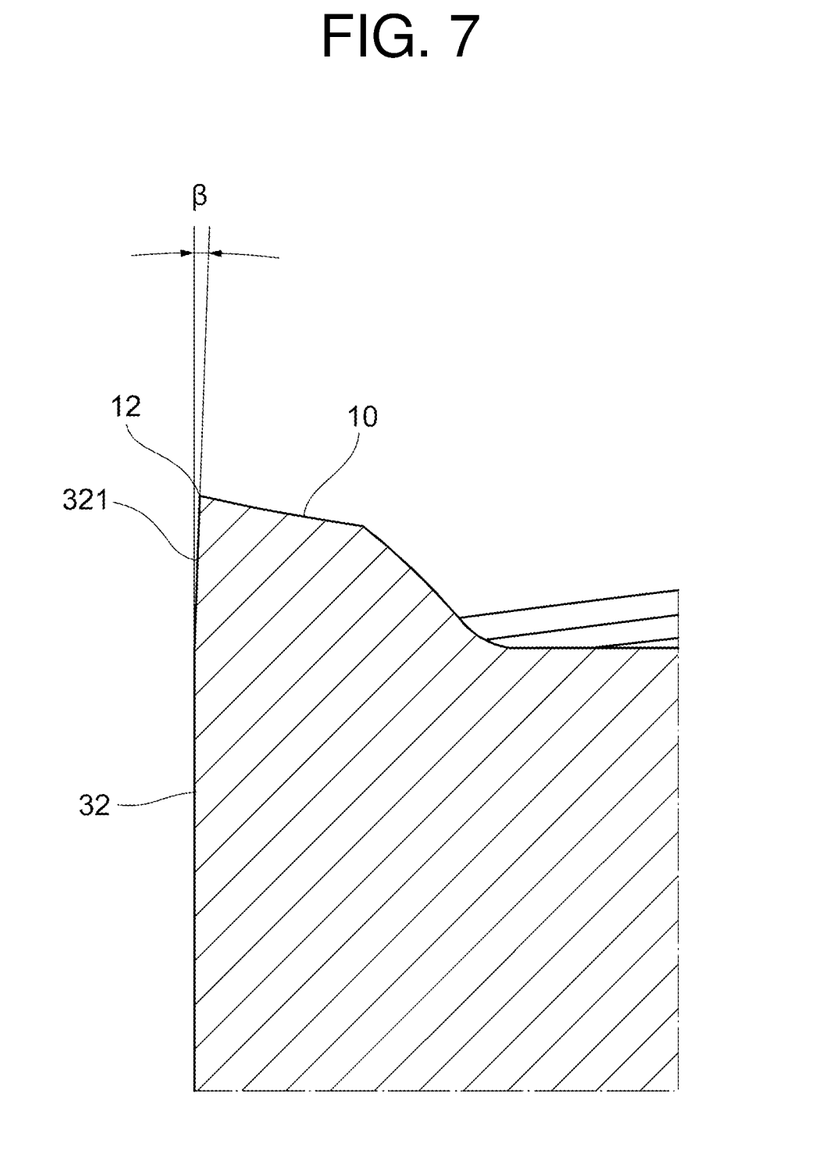
FIG. 7 is a cross-sectional view taken along a line VII-VII shown in FIG. 5.

FIG. 7 is a cross-sectional view taken along a line VII-VII shown in FIG. 5. As shown in FIG. 7, the first wiper edge 12 is formed in a reverse positive shape, whose clearance angle β is negative. Similarly, the second through fourth wiper edges 15, 22, 25 are each formed in a reverse positive shape. In the illustrated example, the clearance angle β is −2°.

Figure 8:
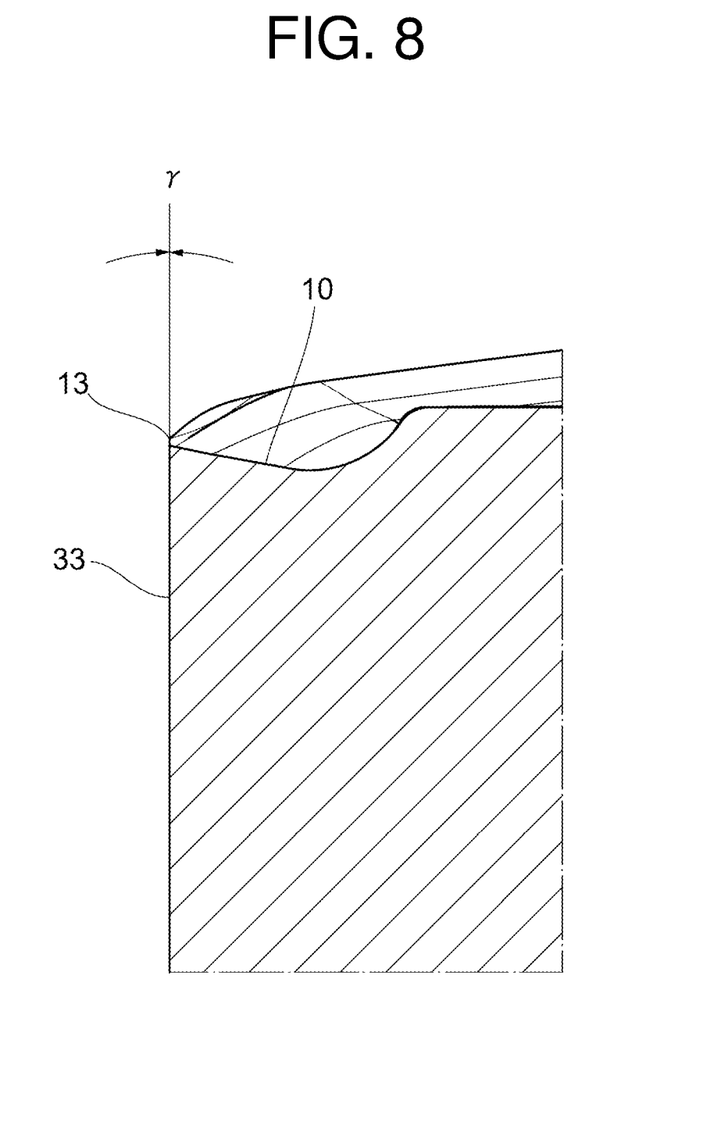
FIG. 8 is a cross-sectional view taken along a line VIII-VIII shown in FIG. 5.

FIG. 8 is a cross-sectional view taken along a line VIII-VIII shown in FIG. 5. As shown in FIG. 8, the first inner edge 13 is formed in a negative shape, whose clearance angle γ is zero. Namely, the flank of the first inner edge 13 is located on the same plane as the third side surface 33. Similarly, the second through fourth inner edges 16, 23, 26 are each formed in a negative shape. The cutting insert 2 of the present invention allows the flanks of the first through fourth inner edges 13, 16, 23, 26 to exist on the same plane as the peripheral side surface 30.

Figure 9:
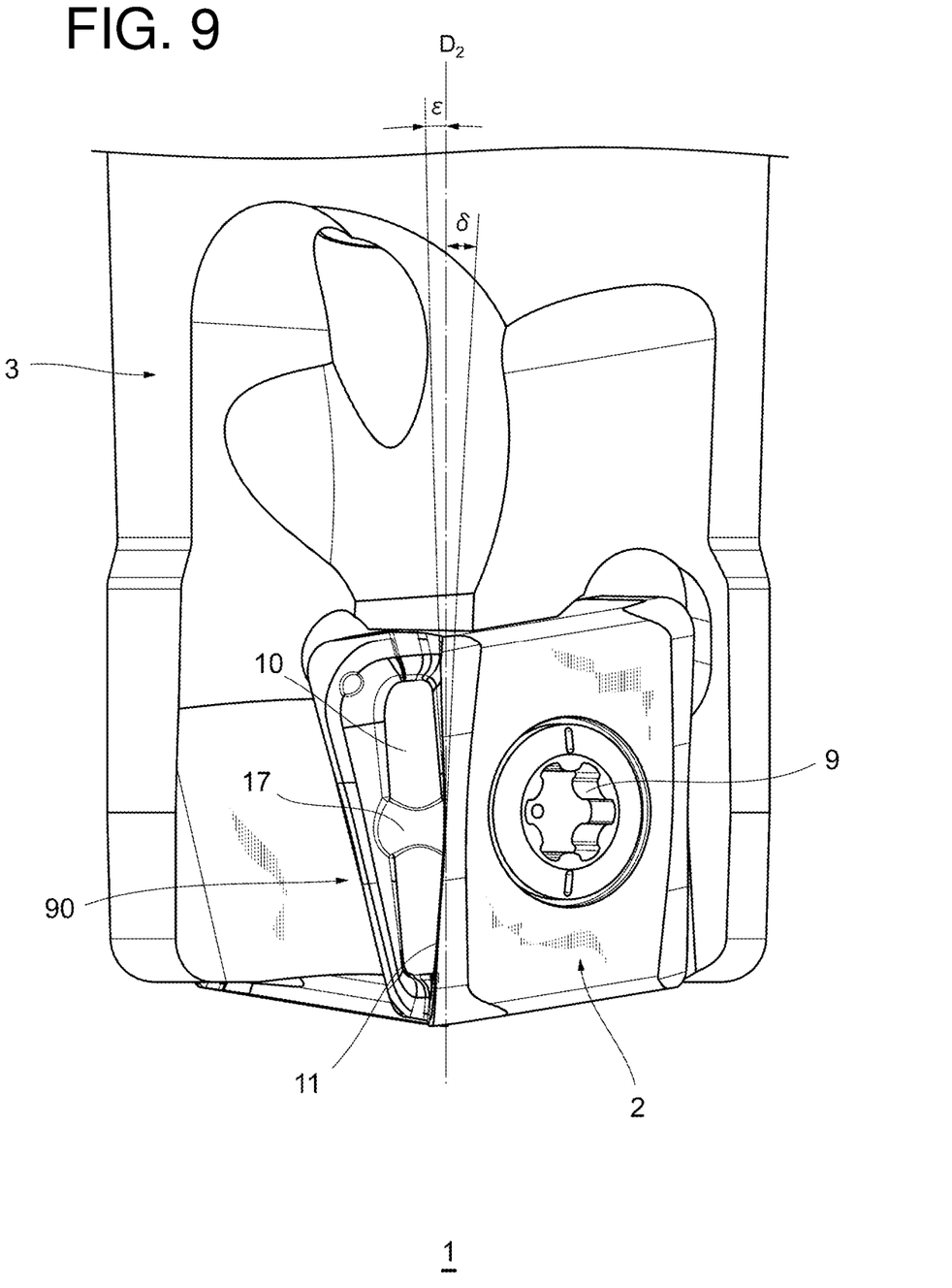
FIG. 9 is a view illustrating rake angles of a major cutting edge of a cutting insert in the state of being mounted on a tool body.

FIG. 9 is a view illustrating rake angles δ, ε of the first major cutting edge 11 of the cutting insert 2 in the state of being mounted on the tool body 3. As shown in FIG. 9, the first major cutting edge 11 is bent in a protruding V shape toward the second end surface 20. A lower half of the first major cutting edge 11 has a positive rake angle δ, which indicates low cutting resistance. Meanwhile, an upper half of the first major cutting edge 11 has a negative rake angle ε, which indicates high cutting resistance.

Figure 10:
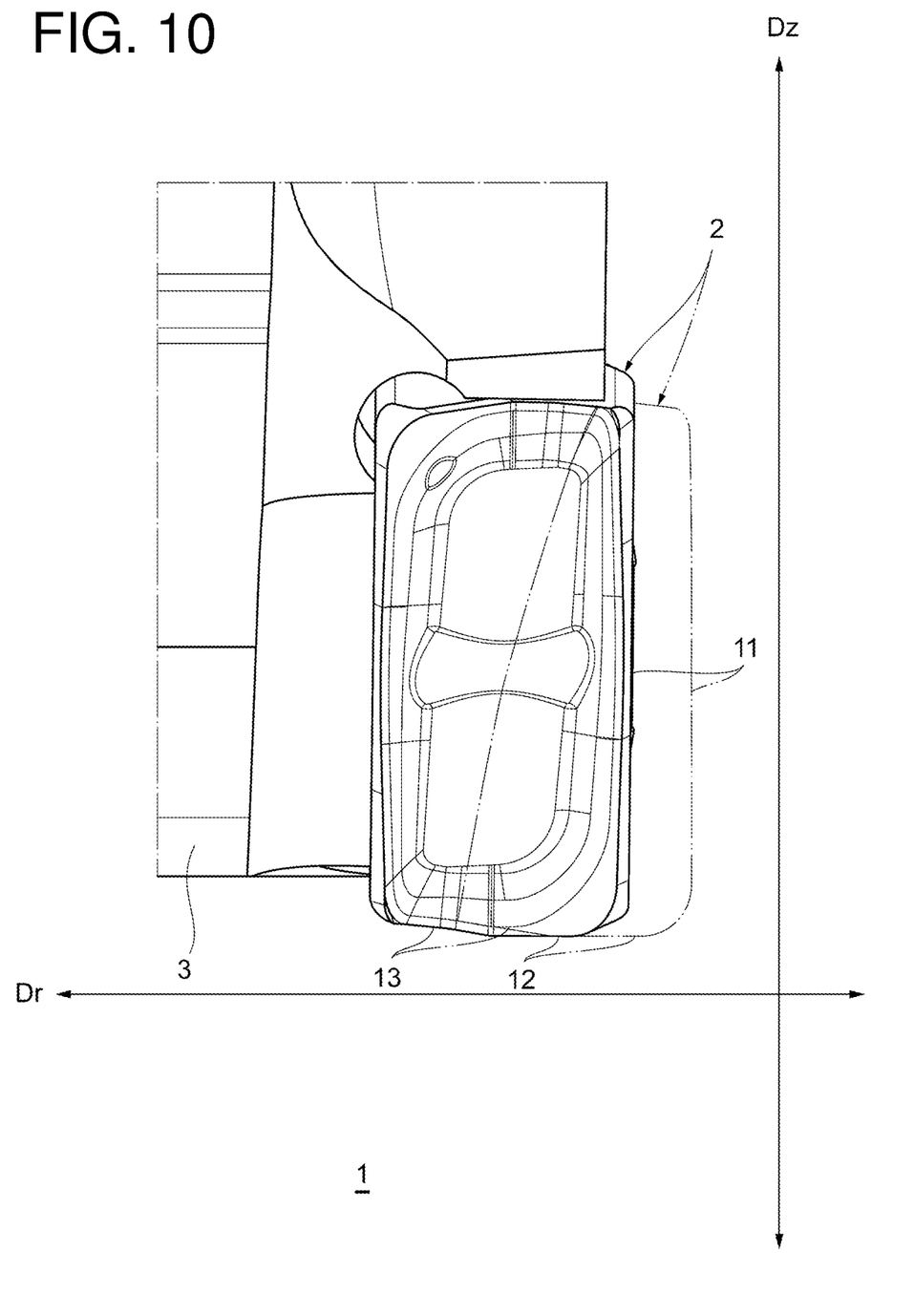
FIG. 10 is a view illustrating a wiper edge angle of a cutting insert in the state of being mounted on a tool body and also illustrating a rotational trajectory of the cutting insert.

FIG. 10 is a view illustrating a wiper edge angle of the first wiper edge 12 of the cutting insert 2 in the state of being mounted on the tool body 3 and also illustrating a rotational trajectory of such cutting insert 2. As shown in FIG. 10, the first wiper edge 12 opposes, in a substantially parallel manner, a finished surface of a workpiece which has been cut by the first major cutting edge 11 in the radial direction Dr of the tool body 3. More specifically, the first wiper edge 12 opposes such finished surface so as to have a wiper edge angle of 0.5°.

The first major cutting edge 11 slightly bulges in a circular arc shape in a direction away from the central axis O. A rotational trajectory of the first major cutting edge 11, which is indicated by a two-dot chain line in FIG. 10, approximates an ideal, virtual cylindrical surface, compared to the case where the first major cutting edge is parallel to the first side surface 31, i.e., the case where the first major cutting edge does not bulge in the direction away from the central axis O.

According to the cutting insert 2 of the embodiment of the present invention and the rotating tool 1 comprising such cutting insert 2, which have been configured as described above, the flank 321 (352, 364, etc.) of the wiper edge 12 (15, 22, 25) and the flank 33 (36, 32, 35) of the inner edge 13 (16, 23, 26) are not located on the same plane, and the rotating tool 1 comprising the cutting insert 2 is therefore compatible with both machining in the radial direction Dr of the tool body 3 and machining in the oblique direction deriving from a combination of the radial direction Dr of the tool body 3 and the axial direction Dz thereof.

Since the inner edge 13 (16, 23, 26) has a negative shape, it is possible to allow the flank of the inner edge 13 to exist on the same plane as the peripheral side surface 30. Thus, the cutting insert 2 has no undercut, and it is therefore easy to manufacture such cutting insert 2 with a mold, compared to the assumed case where the inner edge 13 (16, 23, 26) has a positive shape.

Further, with the cutting insert 2, when grinding finishing is performed, only a small number of passes is required. For example, in the invention of JP6424975 B, a first pass involves the grinding of side surfaces of major cutting edges and flanks of inner edges, a second pass involves the grinding of flanks of wiper edges on a first end surface side, and a third pass involves the grinding of flanks of wiper edges on a second end surface side and flanks of major cutting edges on the second end surface side, which indicates the need for at least three passes. Meanwhile, according to the present invention, a first pass allows for the grinding of the peripheral side surface 30 throughout the periphery thereof, and a second pass allows for the grinding of the flank 311 of the first major cutting edge 11 and the flank 321 of the first wiper edge 12, which enables grinding to be performed in two passes.

The angle α formed by the flank of the major cutting edge 11 (14, 21, 24) and the side surface 31 (34, 34, 31) facing such major cutting edge is −15°, and the angle formed by the flank of the wiper edge 12 (15, 22, 25) and the side surface 32 (35, 33, 36) facing such wiper edge is −2°. A negative clearance angle gradually increases and approaches zero, heading from the major cutting edge 11 (14, 21, 24) toward the inner edge 13 (16, 23, 26), and it is therefore easy to grind the flanks of the major cutting edges and the flanks of the wiper edges with only one pass. Accordingly, it is possible to provide the cutting insert 2 which is compatible with various types of machining without needing to be replaced and which has excellent manufacturability.

Since the major cutting edge 11 (14, 21, 24) is bent in a V shape, the lower half of the major cutting edge has a positive rake angle, which indicates low cutting resistance. Meanwhile, the upper half of the major cutting edge has a negative rake angle, which indicates high cutting resistance. The first end surface 10 can be protected against chips.

Since the first end surface 10 is protected and is therefore less likely to be damaged, when the cutting insert 2 is used after reversing the front and back sides, the first end surface 10 can be fixed reliably to the seating surface 91 of the pocket 90. Further, the cutting insert 2 comprises the protruding ridge 17 having a curved surface shape, whose amount of protrusion is large in a peripheral part thereof, which chips are likely to collide with, and in which a restraining surface is exposed by a large amount in a center part thereof, which chips are less likely to collide with, and thus, a large contact area can be secured between the seating surface 91 and the first end surface 10.

Since the major cutting edge 11 (14, 21, 24), which is inclined so as to head toward the opposite-side end surface, heading away from the wiper edge 12 (15, 22, 25), is fixed in a vertically-placed manner, chips can be discharged with efficiency. This achieves reduced cutting resistance, whereby the occurrence of chipping in edges due to an excessive load can be suppressed. Since the major cutting edge 11 (14, 21, 24) slightly bulges in a circular arc shape in the direction away from the central axis O the rotational trajectory of the major cutting edge approximates an ideal, virtual cylindrical surface, whereby a finished surface with excellent smoothness can be formed.

The embodiments described above are intended to facilitate the understanding of the present invention, and are not intended to allow for the present invention to be interpreted in a limited manner. The elements of the embodiments, as well as the arrangements, materials, conditions, shapes, sizes, etc. thereof, are not limited to those illustrated and may be changed as appropriate. Further, it is possible to partially replace part of a configuration of an embodiment with part of a configuration of another embodiment or to incorporate part of a configuration of an embodiment into a configuration of another embodiment.

What is claimed is:

1. A cutting insert comprising a first end surface, a second end surface on an opposite side to the first end surface, and a peripheral side surface which is parallel to a central axis connecting a center of the first end surface and a center of the second end surface and which connects the first end surface and the second end surface;
   wherein a shape of the first end surface is substantially the same as a shape of the second end surface,
   wherein a first major cutting edge, a first wiper edge adjacent to the first major cutting edge, and a first inner edge adjacent to the first wiper edge are formed in a periphery of the first end surface,
   wherein a periphery of the second end surface comprises a second major cutting edge formed in a long side of the periphery of the second end surface, and a second wiper edge and a second inner edge formed in a short side of the periphery of the second end surface;
   the peripheral side surface comprises a first side surface facing the first major cutting edge, a second side surface facing the first wiper edge, and a third side surface facing the first inner edge;
   a flank of the first major cutting edge and a flank of the first wiper edge are inclined so as to approach the central axis, heading toward the first end surface;
   a flank of the second wiper edge is inclined so as to approach the central axis, heading toward the second end surface;
   the flank of the first major cutting edge is located on a different plane from the first side surface, and the flank of the first wiper edge is located on a different plane from the second side surface;
   a flank of the first inner edge is located on a same plane as the third side surface; and
   the second side surface configures a flank of the second inner edge,
   wherein the first and second inner edges each have a negative shape whose clearance angle is zero; and
   wherein in a perspective view, the second side surface and the third side surface are joined to each other by a single continuous joining surface having a pair of substantially parallel straight edges extending in a direction along the central axis between the flank of the first wiper edge and the flank of the second wiper edge.

2. The cutting insert according to claim 1, wherein the first major cutting edge is bent in a protruding V shape toward the second end surface.

3. The cutting insert according to claim 1, wherein:
   the first end surface is of 180-degree symmetry around the central axis, and a third major cutting edge opposing the first major cutting edge, a third wiper edge adjacent to the third major cutting edge, and a third inner edge adjacent to the third wiper edge are further formed in the periphery of the first end surface;
   the first end surface is divided into two halves by a protruding ridge which is disposed between the first major cutting edge and the third major cutting edge; and
   the protruding ridge is formed as a curved surface whose amount of protrusion from the first end surface decreases as it approaches the central axis.

4. The cutting insert according to claim 2, wherein:
   the first end surface is of 180-degree symmetry around the central axis, and a third major cutting edge opposing the first major cutting edge, a third wiper edge adjacent to the third major cutting edge, and a third inner edge adjacent to the third wiper edge are further formed in the periphery of the first end surface;
   the first end surface is divided into two halves by a protruding ridge which is disposed between the first major cutting edge and the third major cutting edge; and
   the protruding ridge is formed as a curved surface whose amount of protrusion from the first end surface decreases as it approaches the central axis.

5. The cutting insert according to claim 1, wherein:
   the cutting insert is configured as a vertical-placement insert in which a mounting hole for fixing the cutting insert to a tool body is formed in the first side surface; and
   the first major cutting edge is inclined so as to head toward the second end surface, heading away from the first wiper edge.

6. The cutting insert according to claim 2, wherein:
the cutting insert is configured as a vertical-placement insert in which a mounting hole for fixing the cutting insert to a tool body is formed in the first side surface; and
the first major cutting edge is inclined so as to head toward the second end surface, heading away from the first wiper edge.

7. The cutting insert according to claim 3, wherein:
the cutting insert is configured as a vertical-placement insert in which a mounting hole for fixing the cutting insert to a tool body is formed in the first side surface; and
the first major cutting edge is inclined so as to head toward the second end surface, heading away from the first wiper edge.

8. The cutting insert according to claim 4, wherein:
the cutting insert is configured as a vertical-placement insert in which a mounting hole for fixing the cutting insert to a tool body is formed in the first side surface; and
the first major cutting edge is inclined so as to head toward the second end surface, heading away from the first wiper edge.

9. The cutting insert according to claim 1, wherein the first major cutting edge bulges in a direction away from the central axis.

10. The cutting insert according to claim 2, wherein the first major cutting edge bulges in a direction away from the central axis.

11. The cutting insert according to claim 3, wherein the first major cutting edge bulges in a direction away from the central axis.

12. The cutting insert according to claim 4, wherein the first major cutting edge bulges in a direction away from the central axis.

13. The cutting insert according to claim 5, wherein the first major cutting edge bulges in a direction away from the central axis.

14. The cutting insert according to claim 6, wherein the first major cutting edge bulges in a direction away from the central axis.

15. The cutting insert according to claim 7, wherein the first major cutting edge bulges in a direction away from the central axis.

16. The cutting insert according to claim 8, wherein the first major cutting edge bulges in a direction away from the central axis.

* * * * *